(12) United States Patent
Zanzerl

(10) Patent No.: US 6,748,785 B1
(45) Date of Patent: Jun. 15, 2004

(54) FORMING MACHINE WITH CUTTING DEVICE

(75) Inventor: Hermann Zanzerl, Olsberg (CH)

(73) Assignee: Hatebur Umformmaschinen AG, Reinach (CH)

( * ) Notice: Subject to any disclaimer, the term of this patent is extended or adjusted under 35 U.S.C. 154(b) by 69 days.

(21) Appl. No.: 10/110,433

(22) PCT Filed: Sep. 22, 2000

(86) PCT No.: PCT/CH00/00513

§ 371 (c)(1),
(2), (4) Date: Apr. 12, 2002

(87) PCT Pub. No.: WO01/28711

PCT Pub. Date: Apr. 26, 2001

(30) Foreign Application Priority Data

Oct. 15, 1999 (CH) .................................. 1884/99

(51) Int. Cl.[7] ........................... B21D 28/00; B26D 7/02
(52) U.S. Cl. .............................. 72/339; 72/318; 83/198; 83/54
(58) Field of Search ........................ 72/339, 294, 318; 470/156; 83/54, 198, 465

(56) References Cited

U.S. PATENT DOCUMENTS

| | | | | |
|---|---|---|---|---|
| 2,215,927 A | * | 9/1940 | Hayes | .................. 269/82 |
| 2,601,716 A | * | 7/1952 | Laningham | .................. 29/27 B |
| 3,182,538 A | * | 5/1965 | Whitmore | .................. 83/241 |
| 3,204,504 A | * | 9/1965 | Bradlee | .................. 83/198 |
| 4,152,959 A | | 5/1979 | Elhaus | |
| 4,872,384 A | * | 10/1989 | Borzym | .................. 83/54 |
| 5,062,336 A | | 11/1991 | Elhaus | |
| 5,690,010 A | | 11/1997 | Amari et al. | |

FOREIGN PATENT DOCUMENTS

| | | | | |
|---|---|---|---|---|
| DE | 1752917 | | 4/1971 | |
| JP | 63-60038 | | 3/1988 | |
| SU | 483203 | * | 12/1975 | .................. 83/198 |
| SU | 703255 | * | 12/1979 | .................. 83/198 |
| SU | 749578 | * | 7/1980 | .................. 83/198 |

* cited by examiner

Primary Examiner—Daniel C. Crane
(74) Attorney, Agent, or Firm—Leydig, Voit & Mayer, Ltd.

(57) ABSTRACT

A machine with a cutting device includes a stationary bar-cutter blade and a slicing blade which cooperates with and is displaceable in relation to the bar-cutter blade. The slicing blade is a closed circular blade. The bar-cutter blade is a half blade and cooperates with a centering and clamping piece, which is displaceable in relation to the bar-cutter blade, to form together a slotted round blade. The centering and clamping piece can be controllably displaced between a centering position, in which, during operation, the bar to be cut is centered without clamping of the bar; a released position, in which the centering and clamping piece is completely removed from the bar, and a clamping position, in which the centering and clamping piece clamps the bar.

12 Claims, 5 Drawing Sheets

FORMING MACHINE WITH CUTTING DEVICE

The present invention relates to a forming machine with a shearing device.

In forming machines with one or more forming stations, a portion sheared off from a bar is often fed to the first forming station for forming. The shearing of the bar normally takes place in a separate shearing station by means of a fixed bar cutter and a cropping cutter which is displaceable with respect to said bar cutter and is moved back and forth by a shearing carriage. Various possibilities are known for the design of the bar cutter and the cropping cutter.

In cold forming machines, for example, closed round cutters are used as the bar cutter and cropping cutter. The bar to be sheared is pushed into the opening of the bar cutter and cropping cutter and the cropping cutter is subsequently rapidly displaced transversely with respect to the bar, whereby a portion is sheared off from the bar. One disadvantage of the two closed round cutters is that the pushing in of the bar to be sheared involves friction. Furthermore, they cannot be readily used in hot forming machines, since in these machines an unnecessary heat dissipation from the bar should be prevented and the falling out of the scale present should not be hindered.

In hot forming machines, the bar cutter and the cropping cutter are normally designed as half-cutters, i.e. as cutters which bear against the bar only over part of its circumference, the bar to be sheared being held during shearing between the half-cutters and clamping jaws. After shearing, the clamping jaws are moved away for advancing and releasing the bar. For centering the bar, a separate, relatively inflexible centering device is provided. It is disadvantageous that if the position of the portion fed in has to be corrected with respect to the center of the first forming station to optimize the first forming step, many individual parts, namely the cropping cutter, the bar cutter, the clamping jaws and the centering device, have to be reset for the consequently necessary realignment of the center of the cropping cutter and of the bar cutter.

Independently of a forming machine, U.S. Pat. No 5,062,336 discloses a shearing device for shearing bars in which the fixed cutter and the cutter which is displaceable with respect to it respectively comprise two half-cutters.

Likewise independently of a forming machine, U.S. Pat. No. 4,152,959 discloses a shearing device for shearing bars in which the fixed cutter comprises two half-cutters which can be spread apart, while the cutter which is displaceable with respect to said fixed cutter is designed as a closed round cutter. The spreading apart of the half-cutters is very restricted, however, so that the falling out of any scale present is hindered.

U.S. Pat. No. 5,690,010 discloses a shearing device of a forming machine which has a slit round cutter, comprising a fixed bar cutter which is designed as a half-cutter and a clamping piece which is movable with respect to said bar cutter, and also a cropping cutter which interacts with the slit round cutter, is displaceable with respect to it and is designed as a closed round cutter. The clamping piece is adjustable between a position clamping the bar to be sheared and a position not clamping the bar to be sheared, but it is not envisaged for said clamping piece to be moved completely away from the bar, so that the falling out of any scale present is hindered.

In view of the disadvantages of the previously known shearing devices described above, the invention is based on the following object. It is intended to provide a forming machine with a shearing device of the type mentioned at the beginning in which the shearing device makes it possible for the bar which is to be sheared to be pushed in without unnecessary friction and for any scale present to fall out, and also for the setting of the center of the cropping cutter and of the bar cutter to be possible in a simple way.

The essence of the invention is the following: A forming machine comprises a shearing device which has a slit round cutter, comprising a fixed bar cutter which is designed as a half-cutter and a centering and clamping piece which is movable with respect to said bar cutter, and also a cropping cutter which interacts with the slit round cutter, is displaceable with respect to it and is designed as a closed round cutter. The forming machine further comprises control means with which the centering and clamping piece is movable in a controlled manner between a centering position, in which, during operation, it centers a bar to be sheared without clamping it, a release position, in which it is moved completely away from the bar to be sheared, and a clamping position, in which it clamps the bar to be sheared.

The centering of a bar to be sheared takes place according to the invention by the centering and clamping piece in the centering position together with the bar cutter. During shearing, the bar to be sheared is held between the bar cutter and the centering and clamping piece in the clamping position and in the cropping cutter. After shearing, the centering and clamping piece is moved away from the bar cutter into the release position, so that the bar can be advanced again without unnecessary friction. Furthermore, the removal of the centering and clamping piece from the bar in hot forming machines makes it possible for scale to fall out and prevents avoidable heat dissipation from the bar. Both the centering and the clamping of the bar take place by means of the centering and clamping piece, so that it is possible to dispense with an additional centering device. For setting the center of the cropping cutter and of the bar cutter, only the cropping cutter in the form of a closed round cutter and the slit round cutter formed by the bar cutter and the centering and clamping piece have to be accurately positioned.

The forming machine with a shearing device according to the invention is described in more detail below on the basis of an exemplary embodiment with reference to the attached drawings, in which.

FIG. 1

Figure 1:
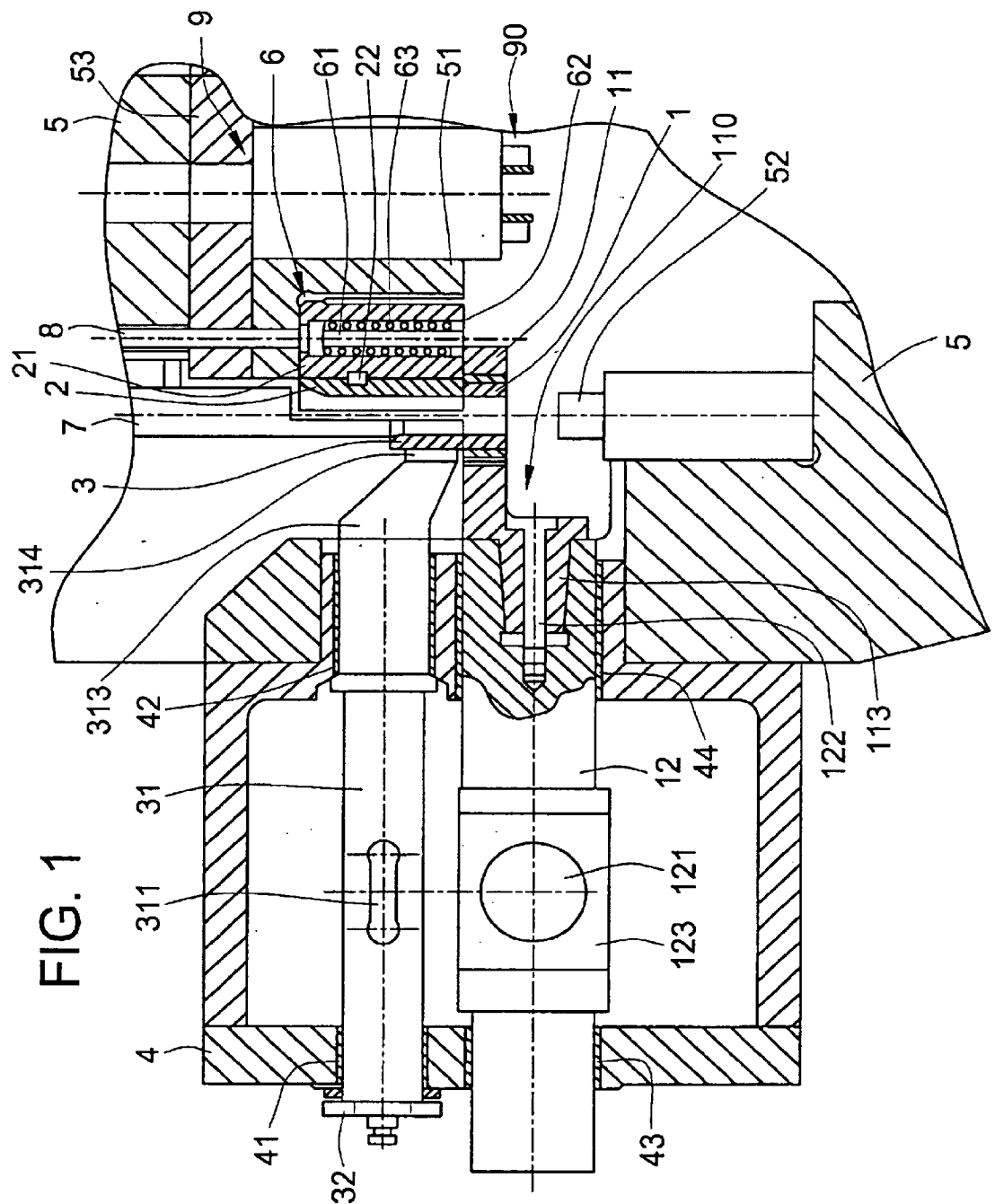
FIG. 1 shows a partly sectioned view from above of essential parts of a shearing device arranged on a forming machine.
Figure 2:
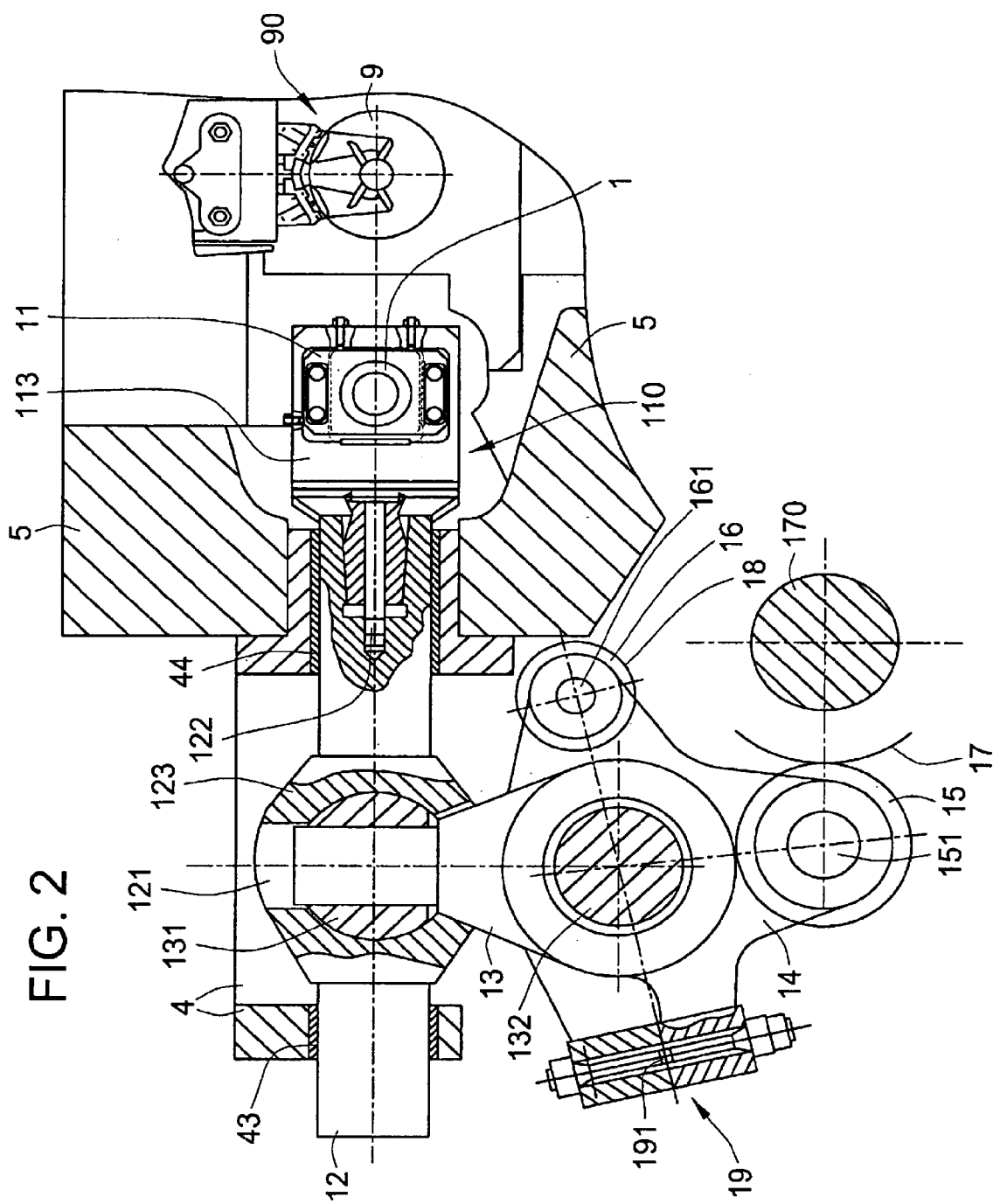
FIG. 2 shows a partly sectioned side view of the forming machine with a shearing device from FIG. 1, in which the cropping cutter and the shearing carriage can be seen.
Figure 3:
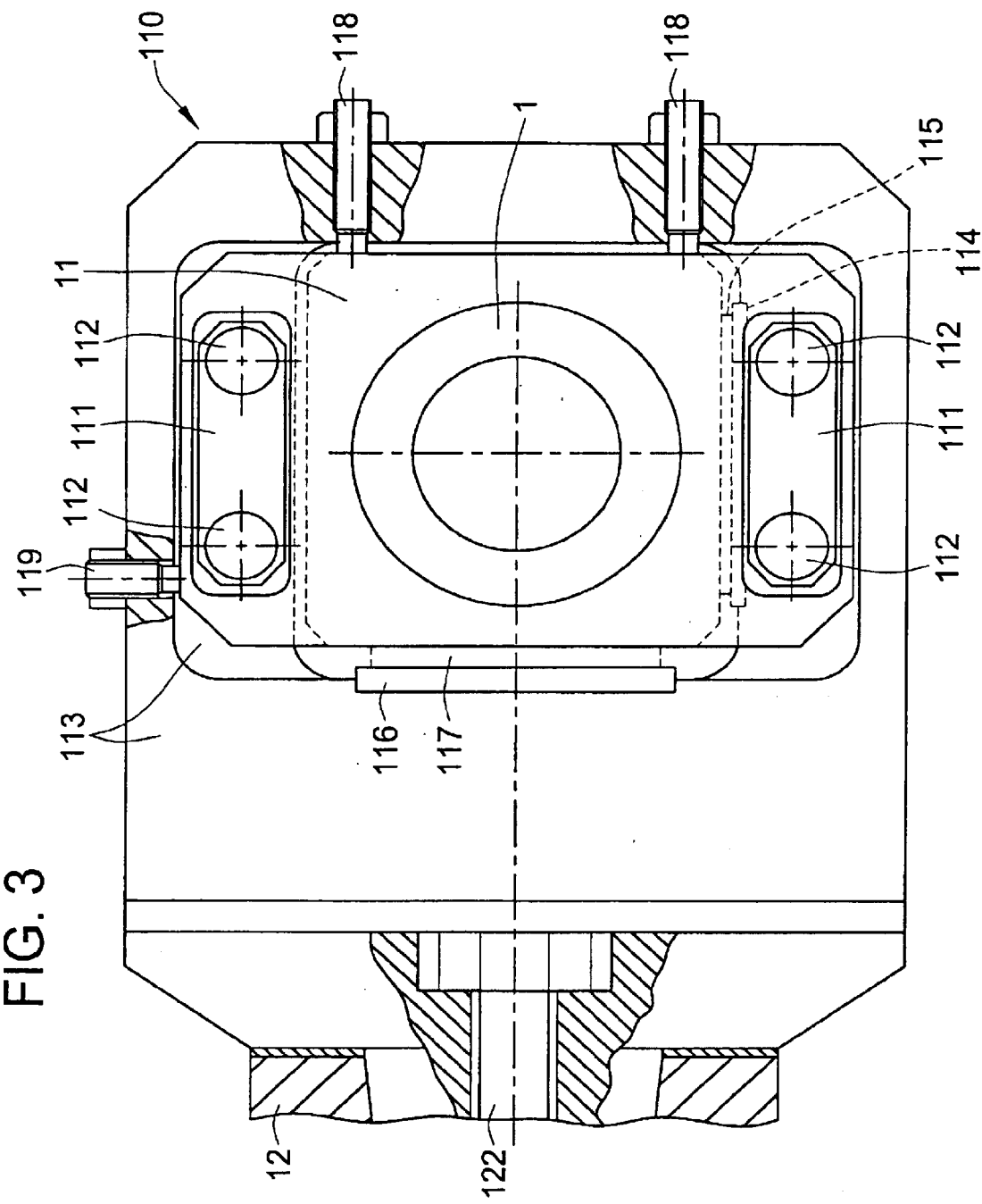
FIG. 3 shows a view of a detail of the arrangement of the cropping cutter.
Figure 4:
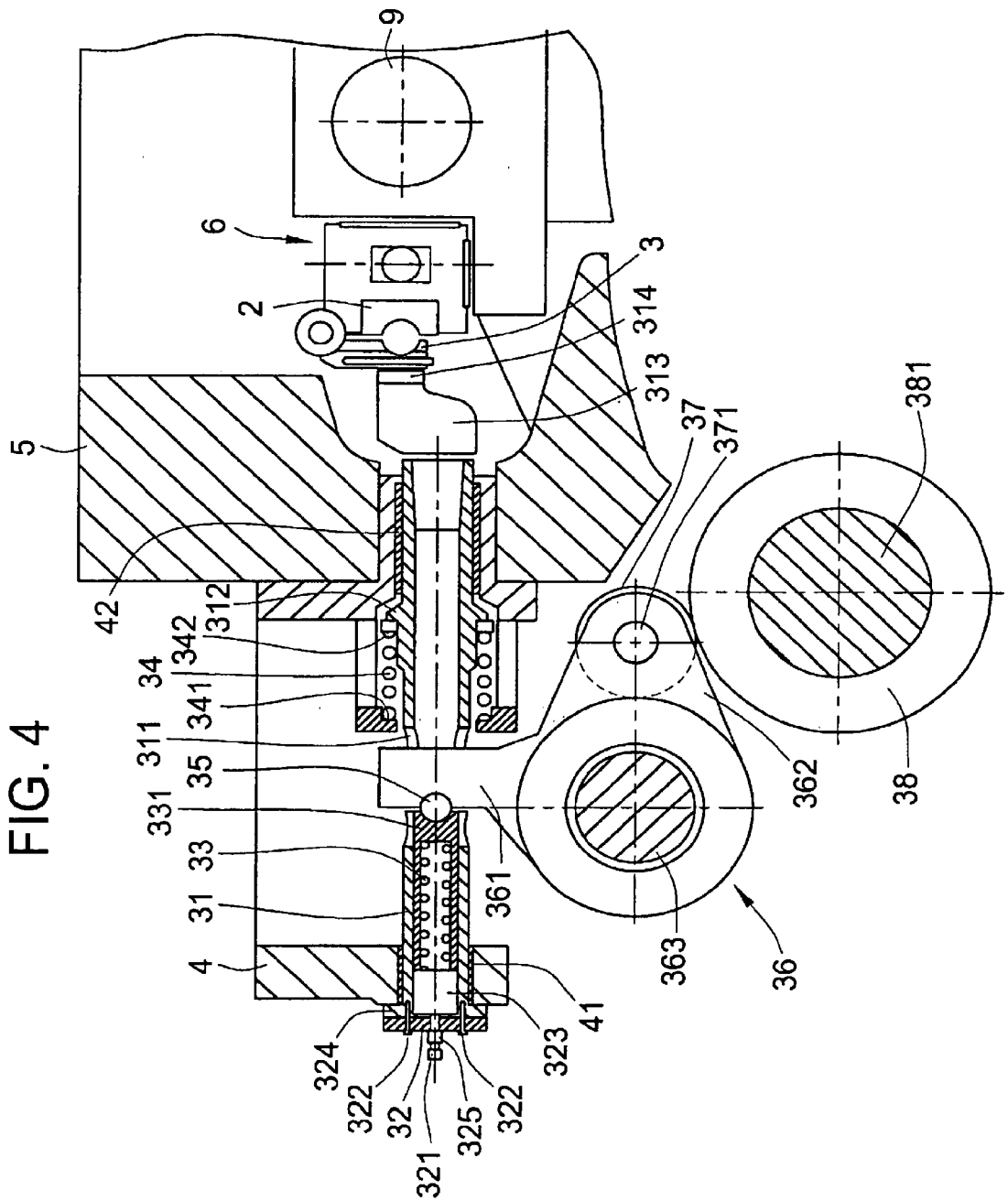
FIG. 4 shows a partly sectioned side view of the forming machine with a shearing device from FIG. 1, in which the bar cutter, the centering and clamping piece and the centering and clamping carriage can be seen.
Figure 5:
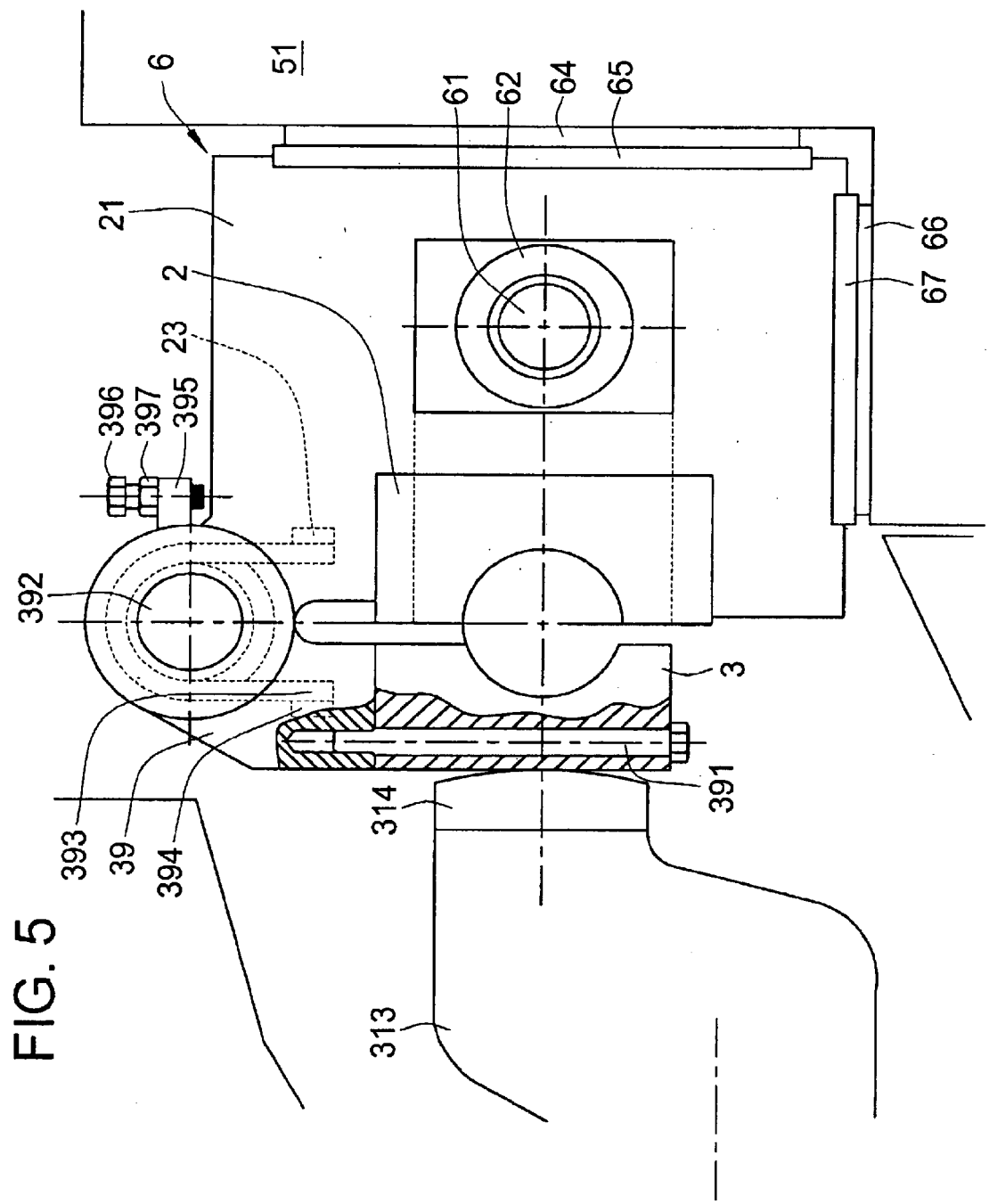
FIG. 5 shows a view of a detail of the arrangement of the bar cutter and the centering and clamping piece.

The forming machine with a shearing device represented comprises a machine body 5, on which an anvil 51 is fitted via a pressure plate 53. A first forming station 9 is indicated. Arranged in front of the anvil 51 is a shearing and loading module 6, which may be releasably fastened on the anvil 51 or on the machine body 5 in various ways, for example by means of screws or hydraulic tensioning or compressing elements. The shearing and loading module 6 has a bar cutter 2 in the form of a semicylindrical half-cutter, which is fitted on a bar cutter carrier 21. Arranged between the bar cutter 2 and the bar cutter carrier 21 is an adjusting wedge 22, which serves for the longitudinal displacement of the bar cutter 2 for setting the shearing gap between the bar cutter 2 and a cropping cutter 1 placed in front of it. Arranged in the bar cutter carrier 21 is a loading pin 61, which is pressed against a loading control rod 8 by means of a compression spring 63 butting against a circular nut 62. For feeding in a bar to be sheared, there extends in the longitudinal direction behind the bar cutter 2 a guiding tube 7, through which the bar can be advanced into the bar cutter 2 and the cropping cutter 1, maximum advancement being reached when it comes up against a bar stop 52, which is fastened on the machine body 5.

The cropping cutter 1 is designed as a closed round cutter which is fitted in a cropping cutter holder 11, which is removably fastened on a cutter head 113. The cropping cutter 1, the cropping cutter holder 11 and the cutter head 113 are part of a cutter head module 110, which is releasably fastened on a displaceable shearing carriage 12 by means of a fastening screw 122, with which carriage the cropping cutter 1 is moved back and forth, to be precise from a position in front of the bar cutter 2 to a position in front of the loading pin 61 and back again. For the drive of the shearing carriage 12, explained further below, a slider bearing 123 with a shearing drive lever hole 121 is provided on said carriage.

During shearing, the bar to be sheared is held in the clamping position, on the one hand in the cropping cutter 1 and on the other hand between the bar cutter 2 and an opposite centering and clamping piece 3. The centering and clamping piece 3 bears against a centering and clamping-piece pressure plate 314, which is fitted on a centering and clamping-carriage head 313 of a centering and clamping carriage 31. For the drive explained further below of the centering and clamping carriage 31, a control lever hole 311 is provided on the latter. At the end of the centering and clamping carriage 31 remote from the centering and clamping-carriage head 313 there is fastened a stroke limitation plate 32, the mode of operation of which is likewise explained further below.

The shearing carriage 12 and the centering and clamping carriage 31 and also the associated drives are arranged in a case 4 anchored on the machine body 5, the shearing carriage 12 being displaceably mounted in bearing bushes 43, 44 and the centering and clamping carriage 31 being displaceably mounted in bearing bushes 41, 42 in the wall of the case.

For shearing off a portion of the bar to be sheared, at the beginning of pushing-in the centering and clamping piece 3 is initially guided briefly toward the bar to be sheared, into the centering position, in order to center said bar without clamping it. The bar can then be introduced optimally into the closed cropping cutter 1. Subsequently, during the further pushing-in of the bar to be sheared into the opening of the cropping cutter 1, the centering and clamping piece 3 is moved away from the bar to be sheared into the release position, i.e. it is released in order to prevent unnecessary friction and disadvantageous heat loss of the bar and to assist the falling out of any scale. Once the bar has been advanced to the desired extent, the centering and clamping piece 3 is pressed against the bar to be sheared into the clamping position, in order to clamp the latter during the actual shearing. The shearing takes place by a rapid displacement of the shearing cutter 1 from the position in front of the bar cutter 2 to the position in front of the loading pin 61. The sheared-off portion is finally pushed out of the cropping cutter 1 by the loading pin 61, which has been pushed forward by means of the loading control rod 8, into transversely transporting tongs 90 and is transported by the latter to the first forming station 9. In FIG. 1, the transversely transporting tongs 90 are located at the first forming station 9. Once the portion has been sheared off, the centering and clamping piece 3 is moved away from the bar to be sheared, and the cropping cutter 1 is moved back again to the position in front of the bar cutter 2.

The following statement applies to the entire further description. If reference numerals are used in a figure for the purpose of graphic illustration, but are not explained in the directly associated text of the description, reference is made to where they are mentioned in previous descriptions of figures.

FIG. 2

It can be seen here that the drive of the shearing carriage 12 takes place via a shearing drive lever 13, which protrudes into the shearing drive lever hole 121 in the slider bearing 123 and is surrounded there by a closely bearing slider 131, which can rotate in the slider bearing 123. The shearing drive lever 13 is securely connected to a double roller lever 14 via an overload safety device 19 with a predetermined breaking point 191, the shearing drive lever 13 and the double roller lever 14 being pivotable about a common axis of rotation 132. Arranged on the double roller lever 14 there is on the one hand a shearing roller 15, which is rotatable about an axis of rotation 151, and on the other hand a counter roller 16, which is rotatable about an axis of rotation 161. The shearing roller 15 bears against a shearing cam 17, only indicated here, while the counter roller 16 bears against a counter cam 18, only indicated here, the two cams being rotated by means of a control shaft 170. The desired movement back and forth of the shearing carriage 12, and consequently of the cropping cutter 1, can be achieved by a corresponding design of the shearing cam 17 and of the counter cam 18.

If the resistance of the bar to be sheared is too great, the overload safety device 19 breaks at the predetermined breaking point 191 and the shearing drive lever 13 is decoupled from the double roller lever 14.

Also represented here in front of the first forming station 9 are the first transversely transporting tongs 90, with which the sheared-off portions of bar pushed out of the cropping cutter 1 are transported into the first forming station 9.

FIG. 3

The cropping cutter holder 11, carrying the cropping cutter 1, and consequently the cropping cutter 1 itself, can be accurately positioned in the x and y directions in the cutter head 113 in the cutter head module 110 by means of a respective fitting plate 116 or 114 and in addition a respective correction plate 117 or 115. The fitting plates 114, 116 are securely mounted on the cutter head 113 and are no longer removed thereafter, while correction plates 115, 117 of a specific thickness are interchangeably fastened on the cropping cutter holder 11 or on the fitting plates 114, 116. By means of adjusting screws 118, 119, the cropping cutter holder 11 is pressed with the correction plates 115, 117 against the fitting plates 114, 116 and in this way is fixed on the cutter head 113. Thereafter, the cropping cutter holder 11 is stably connected to the cutter head 113, via two fastening bridges 111, by means of fastening screws 112, so that the high forces occurring during shearing do not lead to loosening of the cropping cutter holder 11.

In order to achieve reproducible positions with the correction plates 115, 117 in the x and y directions, at the beginning of assembly of the machine reference correction plates 115, 117 of a defined thickness (0 must be used and the thicknesses of the fitting plates 114, 116 must be determined according to the base center of the drawing-in axis. For setting the desired x and y positions of the cropping cutter 1, one or both reference correction plates 115, 117 must simply be replaced by correction plates 115, 117 of a corresponding thickness, which could be taken from a set of correction plates of thicknesses differing for example in steps of ±1/10, ½ or 1 mm.

FIG. 4

The centering and clamping carriage 31 is prestressed toward the bar cutter 2 by means of a clamping spring 34, which is arranged in a clamping spring housing 341 and butts against an annular shoulder 312 of the centering and clamping carriage 31. If there is no bar between the centering and clamping piece 3 and the bar cutter 2, a stroke limitation plate 32 fitted on the centering and clamping carriage 31 by means of fastening screws 322 limits the displacement of the centering and clamping carriage 31 in the direction of the bar cutter 2 by coming up against an annular stroke limitation stop 324 on the case 4. This prevents the centering and clamping piece 3 and the bar cutter 2 from touching each other.

The drive of the centering and clamping carriage 31 takes place via a control arm 361, protruding into the control lever hole 311, of a control lever 36, which is pivotable about an axis of rotation 363. Rotatable about an axis of rotation 371 on a roller arm 362 of the control lever 36 is a control roller 37. The control roller 37 bears against a control cam 38, which is rotated by means of a control shaft 381.

The movement of the control arm 361 is transferred via a link pin 35 to a compression spring housing 331, which presses via an intermediate piece 323 against an adjusting screw 321 arranged in the stroke limitation plate 32. A compression spring 33, arranged in the compression spring housing 331 and supported against the intermediate piece 323, and also the clamping spring 34 exert a torque on the control lever 36, so that the control roller 37 is permanently pressed against the control cam 38. The control cam 38 consequently acts via the control roller 37, the control lever 36, the link pin 35, the compression spring housing 331, the intermediate piece 323, the adjusting screw 321 and the stroke limitation plate 32 on the centering and clamping carriage 31 in the direction opposed to the clamping spring 34. The desired movement back and forth of the centering and clamping carriage 31, and consequently of the centering and clamping piece 3, can be achieved by a corresponding design of the control cam 38.

By means of the adjusting screw 321, which can be blocked by means of a fixing nut 325, the distance of the centering and clamping piece 3 from the bar cutter 2 can be set such that the centering and clamping piece 3 and the bar cutter 2 together bound a circular-cylindrical opening. A setting of this type may be required quite frequently, because, as explained below, the position of the bar cutter 2 varies in the x direction.

FIG. 5

It can be seen here that the centering and clamping piece 3 is fitted on a centering and clamping-piece carrier 39 by means of a fastening screw 391. The centering and clamping-piece carrier 39 is pivotably connected via a link pin 392 to the bar cutter carrier 21, on which the bar cutter 2 is fitted. By means of a torsion spring 393, which butts against a spring abutting piece 394 on the centering and clamping-piece carrier 39 and against a spring abutting piece 23 on the bar cutter carrier 21, the centering and clamping-piece carrier 39 is prestressed with respect to the bar cutter carrier 21 in such a way that the centering and clamping piece 3 is pressed away from the bar cutter 2 against the centering and clamping-piece pressure plate 314 fitted on the centering and clamping carriage 31. The releasing, centering and clamping movements of the centering and clamping piece 3 can consequently be introduced by frictional engagement.

The removable shearing and loading module 6 with the bar cutter carrier 21 can be accurately positioned in the x and y directions on the anvil 51 by means of a respective fitting plate 64 or 66 and in addition a respective correction plate 65 or 67. The fitting plates 64, 66 are securely mounted on the anvil 51 and are no longer removed thereafter, while correction plates 65, 67 of a specific thickness are interchangeably fastened on the bar cutter carrier 21 or on the fitting plates 64, 66.

In order to achieve reproducible positions with the correction plates 65, 67 in the x and y directions, at the beginning of assembly of the machine reference correction plates 65, 67 of a defined thickness (0 must be used and the thicknesses of the fitting plates 64, 65 must be determined according to the base center of the drawing-in axis. For setting the desired x and y positions of the bar cutter 2, one or both reference correction plates 65, 67 must simply be replaced by correction plates 65, 67 of a corresponding thickness, which could be taken from a set of correction plates of thicknesses differing for example in steps of (1/10, +e,fra 1/+ee or 1 mm.

To facilitate the insertion of the shearing and loading module 6 between the anvil 51 or the fitting plates 64, 66 and the centering and clamping-piece pressure plate 314, an adjusting screw 396 for limiting the opening angle between the centering and clamping-piece carrier 39 and the bar cutter carrier 21 is fitted on a continuation 395 of the centering and clamping-piece carrier 39 and can be blocked by means of a fixing nut 397.

Further design variations are feasible for the forming machine with a shearing device described above. The following are additionally to be expressly mentioned here:

Instead of mounting the fitting plates 114, 116 on the cutter head 113 and the correction plates 115, 117 on the cropping cutter holder 11 or on the fitting plates 114, 116, the fitting plates 114, 116 could also be fastened on the cropping cutter holder 11 and the correction plates 115, 117 could also be fastened on the cutter head 113 or on the fitting plates 114, 116.

Instead of mounting the fitting plates 64, 66 on the anvil 51 and the correction plates 65, 67 on the bar cutter carrier 21 or on the fitting plates 64, 66, the fitting plates 64, 66 could also be fastened on the bar cutter carrier 21 and the correction plates 65, 67 could also be fastened on the anvil 51 or on the fitting plates 64, 66.

The shearing and loading module 6 may also be releasably fastened on an L-shaped module carrier in various ways by means of the fitting plates 64, 66 and correction plates 65, 67 arranged in the x and y directions. The module carrier with the shearing and loading module 6 may likewise be releasably fastened on the anvil 51 or on the machine body 5 in various ways, for example by means of screws or hydraulic tensioning or compressing elements.

The connection between the centering and clamping-piece pressure plate 314 and centering and clamping piece 3 may also be formed with a positive locking engagement. The prestressing of the centering and clamping-piece carrier 3 with respect to the bar cutter carrier 21 would then no longer be needed.

Instead of setting the distance of the centering and clamping piece 3 from the bar cutter 2 by means of the adjusting screw 321, this may also take place by a motor-driven threaded spindle.

Instead of by means of the fastening screw 122, the cutter head module 110 may also be releasably fastened on the shearing carriage 12 in some other way, for example by means of hydraulic tensioning or compressing elements.

What is claimed is:

1. A forming machine comprising:

a shearing device including a slit round cutter comprising a fixed bar half-cutter and a centering and clamping piece movable with respect to the bar cutter;

a cropping cutter which interacts with the slit round cutter, is displaceable with respect to the slit round cutter, and is a closed round cutter; and control means moving the centering and clamping piece between a centering position in which the centering and clamping piece centers a bar to be sheared without clamping the bar, a release position, in which the centering and clamping piece is moved completely away from the bar to be sheared, and a clamping position, in which the centering and clamping piece clamps the bar to be sheared.

2. The forming machine as claimed in claim 1, wherein the cropping cutter is arranged in a cropping cutter holder, which can be accurately positioned, with respect to a required position of a bar to be sheared, in two directions, perpendicular with respect to the bar to be sheared, by a respective fitting plate for each direction and a respective correction plate for each direction.

3. The forming machine as claimed in claim 2, wherein the cropping cutter holder is removably fastened on a cutter head, which is fitted on a displaceable shearing carriage.

4. The forming machine as claimed in claim 3, wherein the cropping cutter, the cropping cutter holder, and the cutter head are part of a removable cutter head module.

5. The forming machine as claimed in claim 1, wherein the control means comprises a cam which is shaped such that, at the beginning of pushing-in, the centering and clamping piece is initially guided toward the bar to be sheared, into the centering position, in order to center the bar without clamping the bar, subsequently, during further pushing-in of the bar to be sheared into the opening of the cropping cutter, the centering and clamping piece is moved away from the bar to be sheared into the release position, then the centering and clamping piece is guided to the bar to be sheared, into the clamping position, in order to clamp the bar during the shearing, and, finally, the centering and clamping piece is moved away from the bar to be sheared.

6. The forming machine as claimed in claim 5, wherein the centering and clamping piece is movable by a centering and clamping carriage, which is controlled by the control cam.

7. The forming machine as claimed in claim 6, wherein the centering and clamping-piece is fitted on a centering and clamping-piece carrier which is connected pivotably to a bar cutter carrier on which the bar cutter is fitted.

8. The forming machine as claimed in claim 7, wherein the centering and clamping-piece carrier is prestressed in such a way that the centering and clamping piece is pressed away from the bar cutter against a centering and clamping-piece pressure plate fitted on the centering and clamping carriage.

9. The forming machine as claimed in claim 1, wherein the slit round cutter formed by the bar cutter and the centering and clamping piece can be accurately positioned, with respect to a required position of a bar to be sheared, in two directions perpendicular with respect to the bar to be sheared, by a respective fitting plate for each direction and a respective correction plate for each direction.

10. The forming machine as claimed in claim 7, wherein the bar cutter, the centering and clamping piece, and, optionally, the centering and clamping-piece carrier and the bar cutter carrier are arranged in a removable shearing and loading module.

11. The forming machine as claimed in claim 1, wherein the forming machine is a hot forming machine.

12. The forming machine as claimed in claim 1, wherein the closed round cutter is annular.

* * * * *